(12) United States Patent
Chen et al.

(10) Patent No.: US 9,547,142 B1
(45) Date of Patent: Jan. 17, 2017

(54) OPTICAL TRANSMITTER MODULE

(71) Applicant: SAE Magnetics (H.K.) Ltd., Hong Kong (HK)

(72) Inventors: Yuk Nga Chen, Hong Kong (HK); Xiaoming Yu, Hong Kong (HK); Vincent Wai Hung, Hong Kong (HK); Margarito P. Banal, Jr., Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 14/856,554

(22) Filed: Sep. 16, 2015

(51) Int. Cl.
*H04B 10/071* (2013.01)
*H04B 10/079* (2013.01)
*G02B 6/32* (2006.01)
*G02B 6/34* (2006.01)
*G02B 6/42* (2006.01)

(52) U.S. Cl.
CPC ............... *G02B 6/4286* (2013.01); *G02B 6/32* (2013.01); *G02B 6/34* (2013.01); *G02B 6/423* (2013.01); *G02B 6/4206* (2013.01); *G02B 6/428* (2013.01); *G02B 6/4214* (2013.01); *G02B 6/4239* (2013.01); *G02B 6/4244* (2013.01); *G02B 6/4281* (2013.01); *G02B 6/4292* (2013.01); *H04B 10/071* (2013.01); *H04B 10/07955* (2013.01)

(58) Field of Classification Search
CPC ....... H04B 10/071; H04B 10/079; G02B 6/32; G02B 6/34; G02B 6/4286; G02B 6/4206; G02B 6/4214; G02B 6/423; G02B 6/4239; G02B 6/4244; G02B 6/428; G02B 6/4281; G02B 6/4292

USPC .......................................................... 398/38
See application file for complete search history.

(56) References Cited

U.S. PATENT DOCUMENTS

| | | | |
|---|---|---|---|
| 5,222,175 A | 6/1993 | Tatoh | |
| 5,475,701 A | 12/1995 | Hibbs-Brenner | |
| 5,801,402 A | 9/1998 | Shin | |
| 5,812,582 A | 9/1998 | Gilliland et al. | |
| 6,144,025 A * | 11/2000 | Tei | G01J 1/44 250/206 |
| 6,314,223 B1 | 11/2001 | Te Kolste et al. | |
| 6,368,890 B1 | 4/2002 | Wickstrom et al. | |
| 6,895,147 B2 | 5/2005 | Posamentier | |
| 2004/0190833 A1* | 9/2004 | Mori | G02B 6/262 385/50 |
| 2004/0208458 A1 | 10/2004 | Uno | |
| 2005/0248822 A1* | 11/2005 | Tohgoh | G02B 6/421 359/31 |

(Continued)

FOREIGN PATENT DOCUMENTS

JP 04-035415 A 2/1992
JP 04-355415 A 12/1992

(Continued)

*Primary Examiner* — Dalzid Singh

(57) ABSTRACT

An optical transmitter module includes a coupling optical element configured to couple a first optical signal from a transmitting optoelectronic component to a first light guiding structure. An optical power monitor system is connected with the first light guiding structure and is provided with a beam splitter for splitting the first optical signal into a transmitted optical signal and a reflected optical signal to be directed to a receiving optoelectronic component for measuring power of the reflected optical signal.

19 Claims, 7 Drawing Sheets

(56) References Cited

U.S. PATENT DOCUMENTS

2008/0260379 A1* 10/2008 Beranek ................ G01M 11/37
　　　　　　　　　　　　　　　　　　　　　　　　398/21

FOREIGN PATENT DOCUMENTS

| JP | 2004302454 A | 10/2004 |
| JP | 2005202229 A | 7/2005 |
| JP | 2005283610 A | 10/2005 |

* cited by examiner

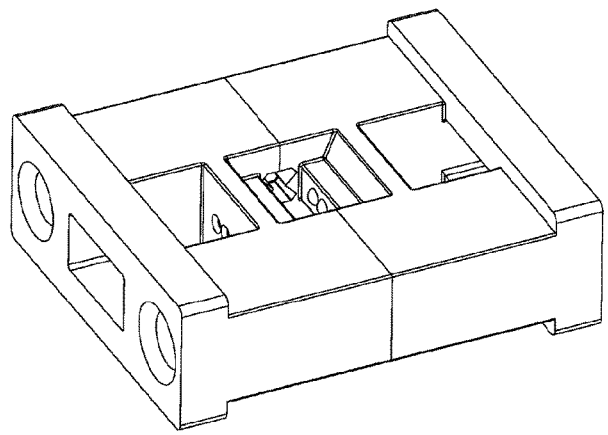
Fig. 6a
Fig. 6b
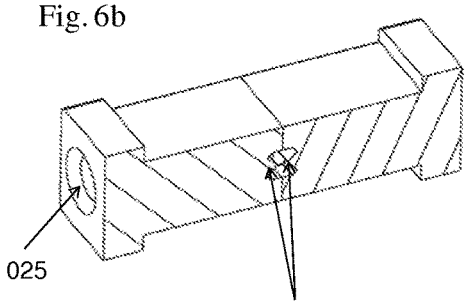
Fig. 6c
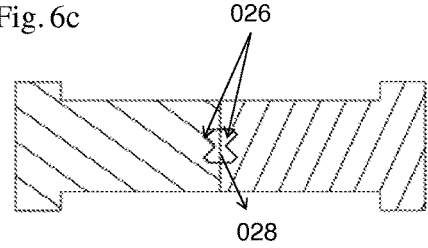
Fig. 6d
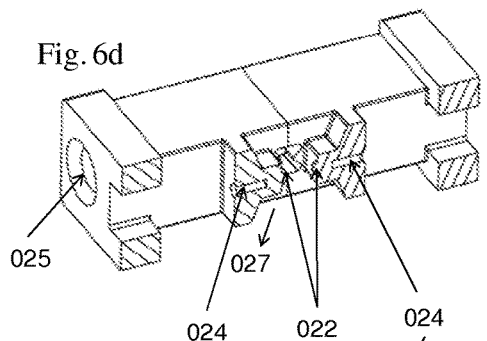
Fig. 6e
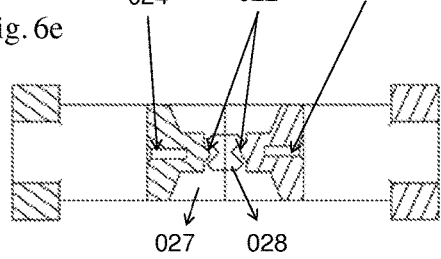

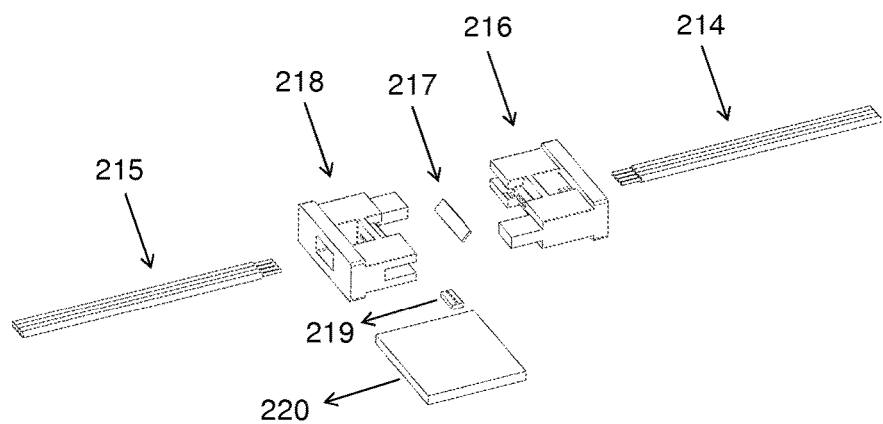
Fig. 9b
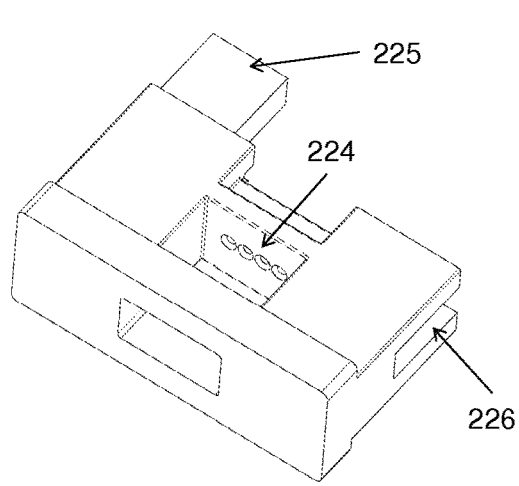
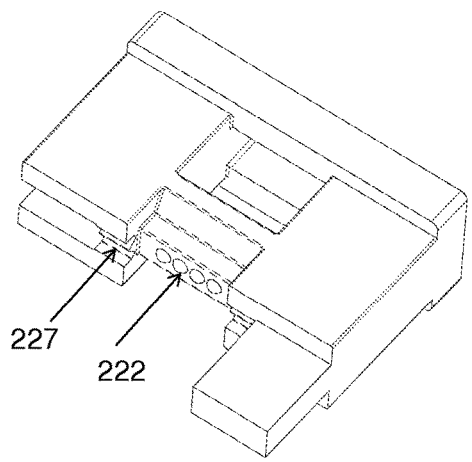
Fig. 10a                    Fig. 10b

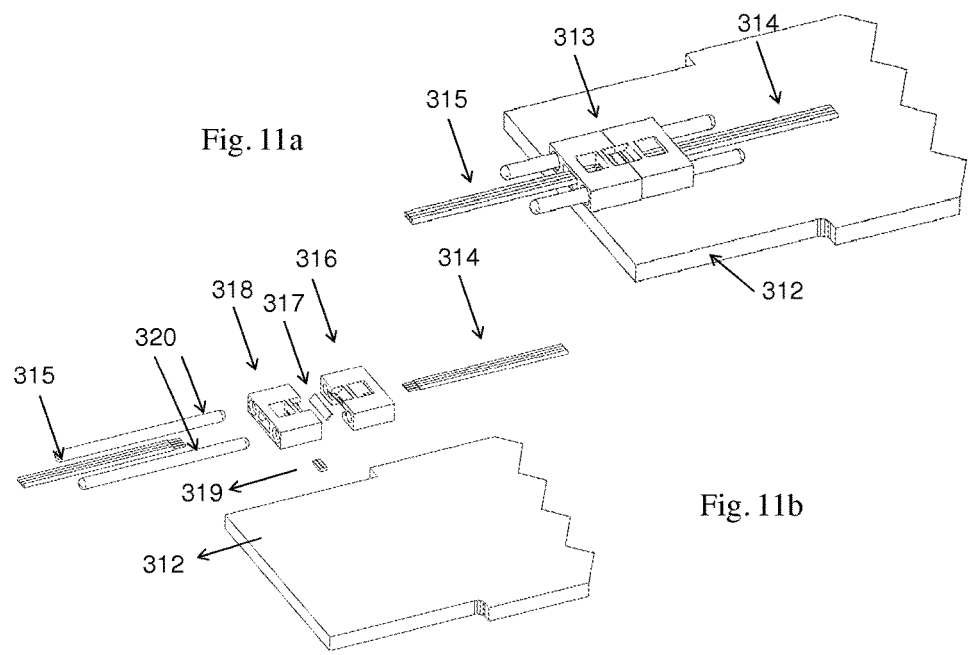
Fig. 11a
Fig. 11b
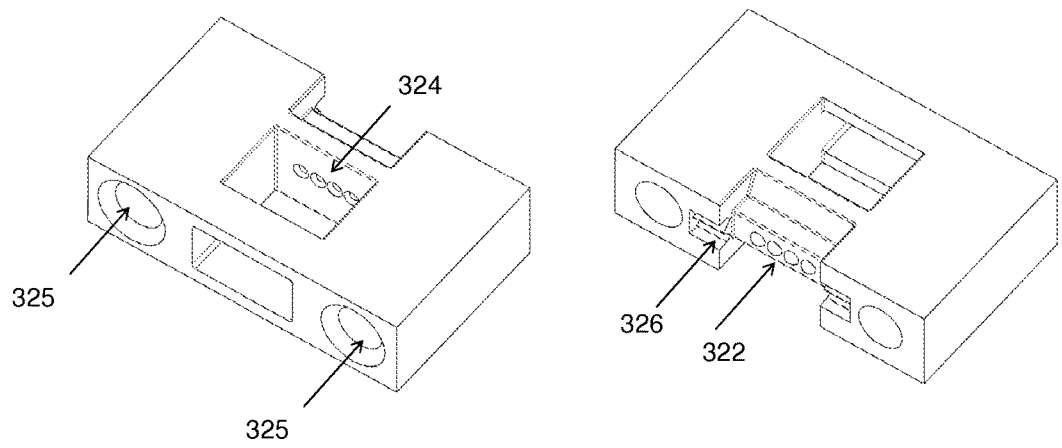
Fig. 12a
Fig. 12b

OPTICAL TRANSMITTER MODULE

FIELD OF THE TECHNOLOGY

The present application relates to an optical transmitter module.

BACKGROUND

Optical transmitter modules are important components for data communications. The module often includes a light emitting device, a light guiding structure and an external optical interface. In this kind of device, a constant optical output is essentially to maintain the quality and stability of the data transmission. However, the optical output power of light emitting devices, such as vertical cavity surface emitting lasers (VCSELs), could be compromised by effects such as the change in the ambient temperature, the aging of the device, etc. In order to maintain a constant optical output, some form of power control is often needed.

Such control is typically done by a feedback circuit control of the output power of the light emitting device during operation. This output power is measured and fed back to the main driver to control the current supplied to the light emitting device, thereby adjusting its optical power output.

Previous attempts to monitor the power of a light emitting device involve the incorporation of an optical sensor alongside the substrate of the light emitting device, which introduces complexity into processing of light emitting device.

The above description of the background is provided to aid in understanding the optical transmitter module, but is not admitted to describe or constitute pertinent prior art to the optical transmitter module, or consider any documents cited herein as material to the patentability of the claims of the present application.

SUMMARY

According to one aspect, there is provided an optical transmitter module which may include a housing, a main substrate mounted inside the housing and provided with an interface integrated circuit and an electrical interface electrically connected with the integrated circuit, a transmitting optoelectronic component mounted on the main substrate, a coupling optical element configured to couple a first optical signal from the transmitting optoelectronic component to a first light guiding structure, and an optical power monitor system connected to the first light guiding structure and comprising a beam splitting optical element and a receiving optoelectronic component mounted on a sub-substrate. The beam splitting optical element can be configured to split the first optical signal from the first light guiding structure into a transmitted optical signal and a reflected optical signal, and direct the transmitted optical signal towards an external optical interface via a second light guiding structure, and direct the reflected optical signal towards the receiving optoelectronic component configured to measure the power of the reflected optical signal, which is proportional to the first optical signal.

In one embodiment, the first optical signal monitored by the optical power monitor system may be fed back to an analog-to-digital converter circuit in a main circuitry for real time monitoring and control of optical power output of the transmitting optoelectronic component.

In one embodiment, the beam splitting optical element may include a first lens block, a second lens block and a beam splitter inserted between the first lens block and the second lens block. The first lens block can be configured to couple the first optical signal from the first light guiding structure to the beam splitter. The second lens block can be configured to couple the transmitted optical signal from the beam splitter to the second light guiding structure. The beam splitter can be configured to reflect a minor portion of the first optical signal onto the receiving optoelectronic component and transmit a major portion of the first optical signal to the second lens block.

According to another aspect, there is provided an optical transmitter module which may include a transmitting optoelectronic component mounted on a main substrate, a coupling optical element configured to couple a first optical signal from the transmitting optoelectronic component to a first light guiding structure, and an optical power monitor system connected to the first light guiding structure and comprising a beam splitting optical element and a receiving optoelectronic component mounted on a sub-substrate. The beam splitting optical element can be configured to split the first optical signal from the first light guiding structure into a transmitted optical signal and a reflected optical signal, and direct the transmitted optical signal towards an external optical interface via a second light guiding structure, and direct the reflected optical signal towards the receiving optoelectronic component configured to measure the power of the reflected optical signal, which is proportional to the first optical signal.

In one embodiment, the first optical signal monitored by the optical power monitor system can be fed back to an analog-to-digital converter circuit in a main circuitry for real time monitoring and control of optical power output of the transmitting optoelectronic component.

In one embodiment, the sub-substrate of the optical power monitor system can be a printed circuit board or a flexible circuit board.

In one embodiment, the sub-substrate of the optical power monitor system may be the main substrate of the module, and the receiving optoelectronic component and the beam splitting optical element may be mounted directly on the main substrate.

In one embodiment, the beam splitting optical element may be bonded onto the sub-substrate and defines a cavity that accommodates the receiving optoelectronic component.

In one embodiment, the beam splitting optical element may include a first lens block, a second lens block and a beam splitter inserted between the first lens block and the second lens block. The first lens block can be configured to couple the first optical signal from the first light guiding structure to the beam splitter. The second lens block can be configured to couple the transmitted optical signal from the beam splitter to the second light guiding structure. The beam splitter can be configured to reflect a minor portion of the first optical signal onto the receiving optoelectronic component and transmit a major portion of the first optical signal to the second lens block. The first lens block may be identical to the second lens block.

In one embodiment, the beam splitter may be a glass plate with a partially reflective surface, and the glass plate may be placed between the first and second lens blocks, and the normal of the glass plate may be at an inclined angle of 45 degrees with respect to an optical path between the first and second lens blocks.

In one embodiment, each of the first and second lens blocks may further include a prism wedge structure, and when the first and second lens blocks are mated to each other, the prism wedge structures define a cavity that accommodates the glass plate at the inclined angle. Each of the first and second lens blocks may further include an alignment pin hole, and the beam splitting optical component may further include alignment metal pins that are inserted into the pin holes respectively to physically and optically align the first and second lens blocks. Each of the first and second lens blocks may further include a locating post and a locating slot, and the first and second lens blocks align with each other physically and optically by mating the locating posts and the locating slots. The locating posts and the locating slots may be rectangular in shape.

In one embodiment, the main substrate may be provided with an interface integrated circuit, and an electrical interface may be electrically connected with the interface integrated circuit. The main substrate may be mounted inside a housing. The housing may include an upper housing and a lower housing.

Although the optical transmitter module is shown and described with respect to certain embodiments, it is obvious that equivalents and modifications will occur to others skilled in the art upon the reading and understanding of the specification. The optical transmitter module in the present application includes all such equivalents and modifications, and is limited only by the scope of the claims.

BRIEF DESCRIPTION OF THE DRAWINGS

Specific embodiments of the optical transmitter module will now be described by way of example with reference to the accompanying drawings wherein:

FIGS. 4b and 4c are enlarged views of the optical power monitor system of FIG. 4a.

FIG. 6a shows a perspective view of the two lens blocks mated together.

FIGS. 6b-6e show the cross sectional perspective and side views of the two lens blocks mated together at two different cross sections.

FIGS. 9a and 9b show perspective and exploded views of the optical power monitor system respectively according to another embodiment of the present application.

FIGS. 10a and 10b show front and rear perspective views of the lens block in the optical power monitor system respectively according to another embodiment of the present application.

FIGS. 11a and 11b show perspective and exploded views of the optical power monitor system respectively according to a further embodiment of the present application.

FIGS. 12a and 12b show front and rear perspective views of the lens block in the optical power monitor system respectively according to a further embodiment of the present application.

DETAILED DESCRIPTION

Figure 1:
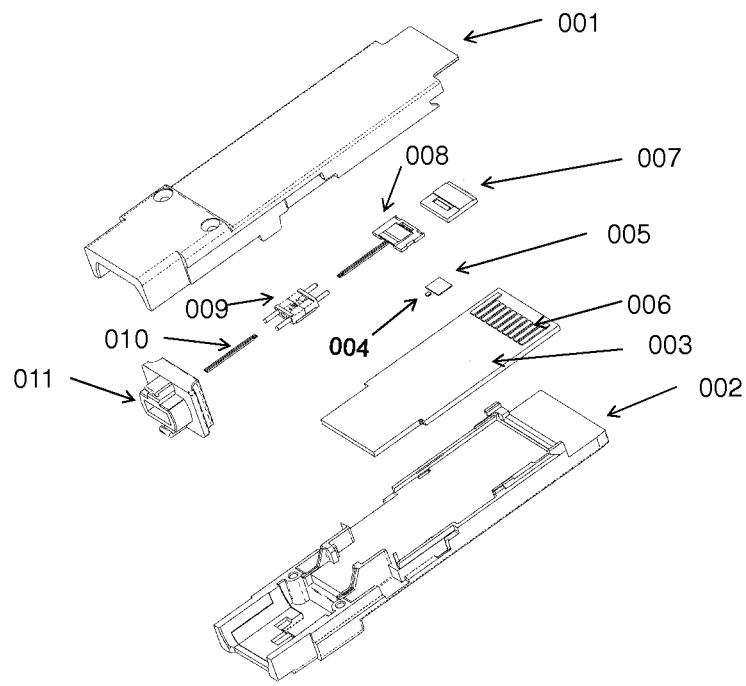
FIG. 1 is an exploded view of the optical transmitter module that includes an optical power monitor system for tapping the power from the transmitting element inside the module according to an embodiment of the present application.

Reference will now be made in detail to a preferred embodiment of the optical transmitter module, examples of which are also provided in the following description. Exemplary embodiments of the optical transmitter module are described in detail, although it will be apparent to those skilled in the relevant art that some features that are not particularly important to an understanding of the optical transmitter module may not be shown for the sake of clarity.

Furthermore, it should be understood that the optical transmitter module is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

For illustration purposes, the terms such as "upper", "lower", "vertical", "horizontal", "top", "bottom", "left" or "right" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical, electrical or optical communication with another element.

As used herein, the terms "first", "second" and "third" etc. are not used to show a serial or numerical limitation but instead are used to distinguish or identify the various members of the device.

Figure 2:
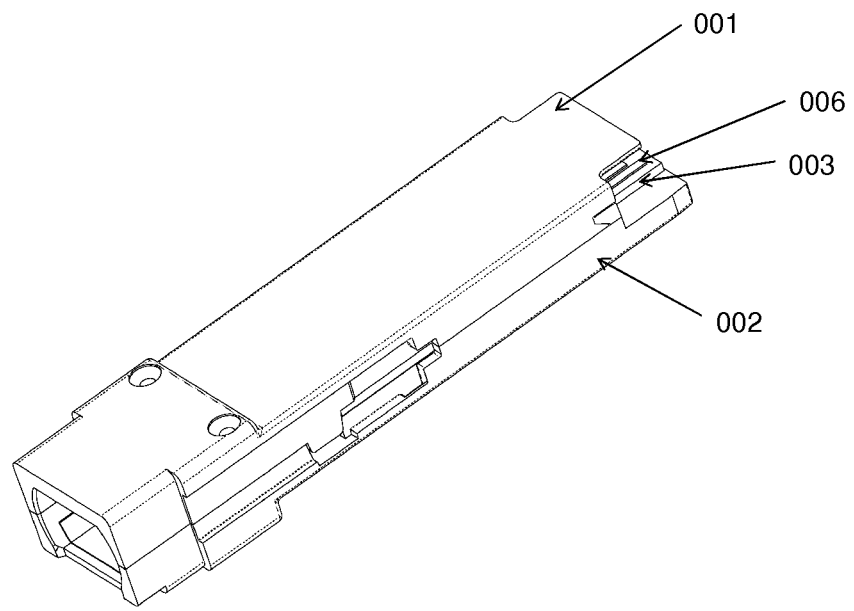
FIG. 2 shows a perspective view of the optical transmitter module, showing the elements of the module enclosed by the top and bottom housings.

FIGS. 1 and 2 show an optical transmitter module according to an embodiment of the present application. The optical transmitter module may include an upper housing 001 and a lower housing 002. The upper housing 001 and the lower housing 002 may be made of metal or other suitable material. A main substrate 003 may be mounted inside the upper and lower housings 001, 002. The main substrate 003 can be a printed circuit board.

The main substrate 003 may be provided thereon with an interface integrated circuit 005. The interface integrated circuit 005 may include a transmitter driver circuit. The transmitter driver circuit may be electrically connected to and placed in close proximity to a transmitting optoelectronic component 004 by a distance less than 1 mm. An electrical interface 006 may be disposed on the main substrate 003 and electrically connected with the interface integrated circuit 005.

At least one transmitting optoelectronic component 004 may be mounted on the main substrate 003. The transmitting optoelectronic component 004 can be a vertical cavity surface emitting laser (VCSEL).

A coupling optical element 007 may be provided to couple a first optical signal from the transmitting optoelectronic component 004 to a first light guiding structure 008. The coupling optical element 007 can be a single molded optical element such as a lens block. The coupling optical element 007 may be bonded onto the main substrate 003 and define a cavity that accommodates therein the transmitting optoelectronic component 004 and the interface integrated circuits 005.

An optical power monitor system 009 may be connected to the main substrate electrically and/or physically by connecting means. The first light guiding structure 008 may be a transmitting jumper fiber 008 or any form of optical waveguide that optically connects the coupling optical element 007 and the optical power monitor system 009. The second light guiding structure 010 can be an optical fiber or any form of optical waveguide that optically connects the optical power monitor system 009 and the external optical interface 011. The external optical interface 011 can be made compatible with standard multi-fiber push on (MPO) connectors.

Inside the optical transmitter module, the optical power of a light emitting device, e.g. a VCSEL 004, may be monitored by the optical power monitor system 009 that taps the optical power from the light guiding structure, e.g. an optical fiber or a waveguide structure 008, 010, which optically connects the VCSEL 004 and the external optical interface 011.

Figure 3A:
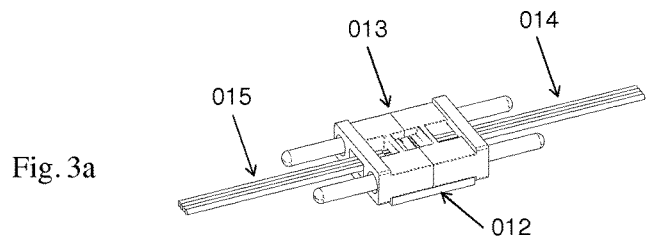
FIGS. 3a and 3b show perspective and exploded views of the optical power monitor system respectively according to an embodiment of the present application.
Figure 3B:
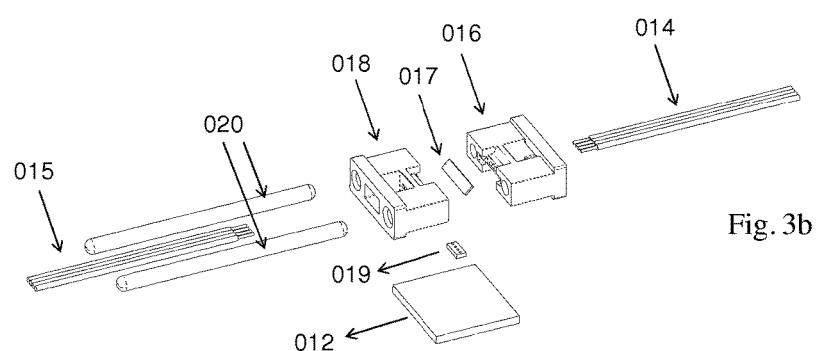
Figure 4A:
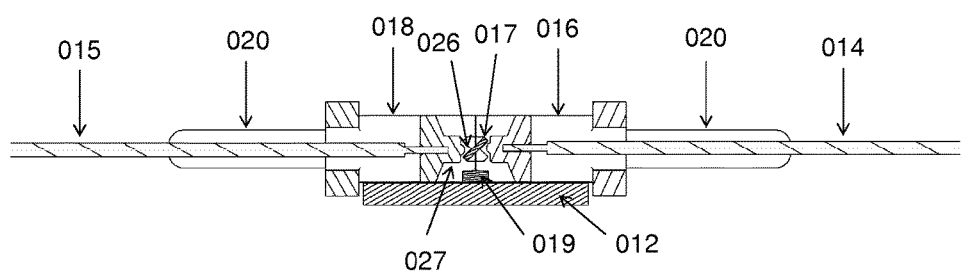
FIG. 4a shows a cross sectional view of the optical power monitor system according to an embodiment of the present application.
Figure 4B:
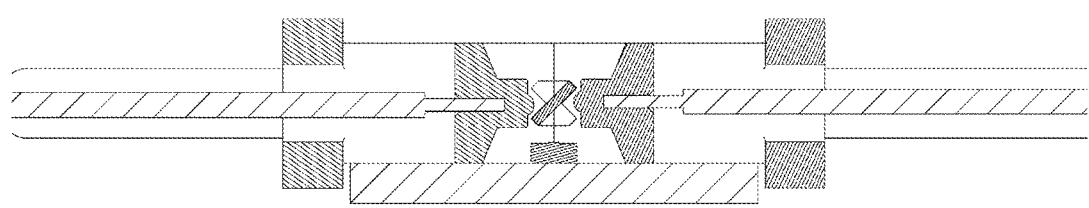
Figure 4C:
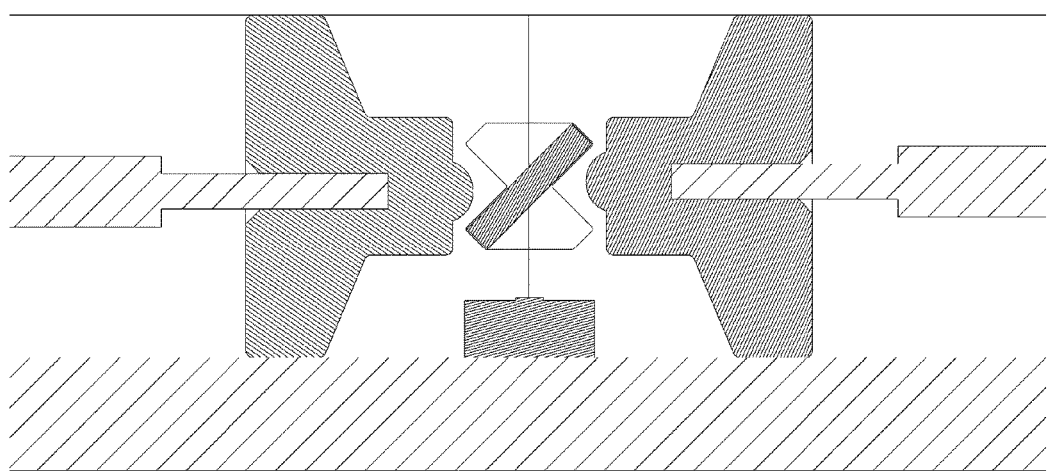
Figure 5A:
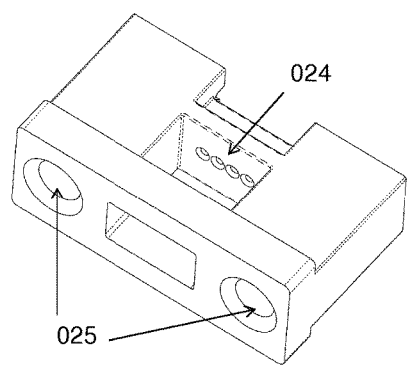
FIGS. 5a and 5b show front and rear perspective views of the lens block in the optical power monitor system according to an embodiment of the present application.
Figure 5B:
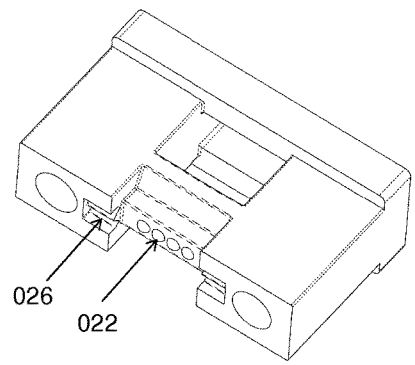

FIGS. 3a, 3b and 4a show the optical power monitor system 009 according to an embodiment of the present application. FIGS. 4b and 4c are merely enlarged views of the optical power monitor system 009 in FIG. 4a. The optical power monitor system 009 may be configured to monitor the first optical signal from the first optical fiber 014 (first light guiding structure) and couple the transmitted signal to the second optical fiber 015 (second light guiding structure).

The optical power monitor system 009 may include a beam splitting optical element 013 and a receiving optoelectronic component 019 provided on a printed circuit board or sub-substrate 012. The receiving optoelectronic component 019 may be a photodiode (PD) array. The optical power monitor system 009 may be mounted on the sub-substrate 012 in a space between the coupling optical element 007 and the external optical interface 011. The sub-substrate 012 of the optical power monitor system 009 may be a printed circuit board fixedly mounted on the main substrate 003 using adhesive.

The beam splitting optical element 013 may be in the form of a glass plate 017 whose normal direction may be at an angle of 45 degrees with respect to an optical path between a first lens block 016 and a second lens block 018. The glass plate 017 may be configured to split the first optical signal from the first light guiding structure 008 into a transmitted optical signal and a reflected optical signal, and direct the transmitted optical signal towards the external optical interface 011 via the second light guiding structure 010, and direct the reflected optical signal towards the receiving optoelectronic component 019 configured to measure the power of the reflected optical signal, which is proportional to the power of the first optical signal.

The optical signal from the VCSEL 004 may be coupled by the light guiding structure 008 to the optical power monitor system 009. The beam splitter optical element 13 may split the optical power into two portions. A minor portion of the first optical signal may be directed towards and measured by the receiving optoelectronic component 019 and fed back to an analog-to-digital converter circuit in a main circuitry for real time monitoring and control of optical power output of the VCSEL 004. A major portion of the first optical signal may be transmitted and coupled to the external optical interface 011. The optical power monitor system 009 can be fitted in between the VCSEL 004 and the external optical interface 011 and embedded within the upper and lower housings 001, 002 of the optical transmitter module.

In the present embodiment, the beam splitting optical element 013 may include two identical lens blocks 016 and 018 that mate with each other. The mating can be facilitated by alignment features formed on the two lens blocks 016, 018. The alignment features could be alignment holes 025 formed on the lens blocks for the insertion of alignment pins 020. The alignment features could also be a locating post and a locating slot that mate with each other.

The first lens block 016 can be configured to couple the first optical signal from the first optical fiber array 014 to the glass plate 017. The second lens block 018 can be configured to couple the transmitted optical signal from the glass plate 017 to a second optical fiber array 015.

FIGS. 5a, 5b and 6a-6e show the first and second lens blocks 016, 018 according to an embodiment of the present application. The first lens block 016 may include a first lens array 022, a fiber guiding structure 024, alignment pin holes 025 and prism wedge structures 026.

The first lens array 022 can be configured to collimate the first optical signal from the first optical fiber array 014. The fiber guiding structure 024 can be configured to accommodate the first optical fiber array 014 and align the first optical fiber array 014 to the first lens array 022. The fiber guiding structure 024 may be V-grooves or blind holes. The alignment pin holes 025 can be configured for the insertion of the alignment metal pin 020 to align the first lens block 016 with the second lens block 018. The prism wedge structure 026 can be configured to support the glass plate 017 at a desired inclined angle when mated with the second lens block 018.

Similar to the first lens block 016, the second lens block 018 may also include a second lens array, a fiber guiding structure, alignment pin holes and prism wedge structures. The second lens block 018 can be configured to couple the transmitted optical signal from the glass plate 017 to the second optical fiber array 015. The fiber guiding structure can be configured to accommodate the second optical fiber array 015 and align the second optical fiber array 015 to the second lens array. The second lens block 018 may employ a structure identical to the first lens block 016.

Alignment pin holes 025 on the lens blocks and the alignment metal pins 020 can be configured to achieve physical and optical alignment between the first lens block 016 and the second lens block 018. The first lens block 016 and the second lens block 018 can mate with each other through the alignment pins. They may be bonded onto the sub-substrate 012 and define a cavity 027 that accommodates the PD array 019 and bonded wire.

When the first lens block 016 and the second lens block 018 are mated with each other, the prism wedge structure 026 on the two lens blocks can define a cavity 028 to accommodate the glass plate 017 at an inclined angle. These characteristics can simplify the assembly process.

The normal of the glass plate 017 may be at an angle of 45 degrees with respect to the optical path between the first and second lens blocks 016, 018. The surface of the glass plate 017 close to the first lens block 016 may be coated with an 80% transmission optical coating; wherein 20% of the first optical signal from the first optical fiber array 014 can be reflected to a direction perpendicular to the original optical path onto the PD array 019, while the 80% transmitted optical power is directed towards the lens on the second lens block 018.

Figure 7:
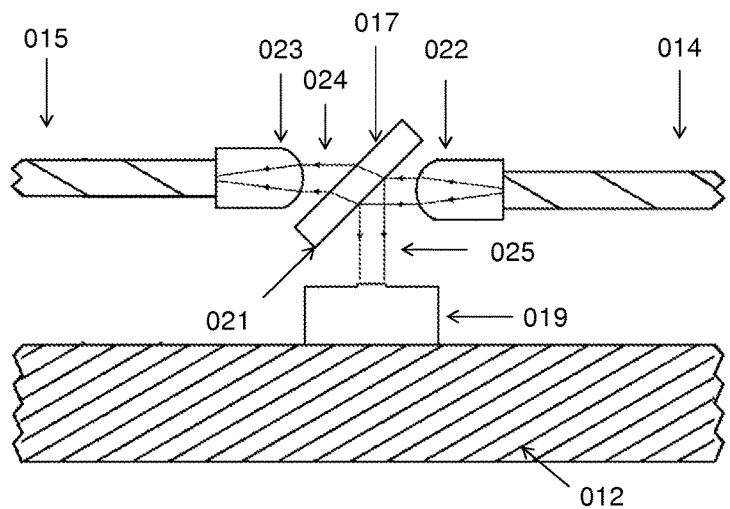
FIG. 7 shows a cross sectional view of the optical components of the optical power monitor system with optical path indicated by arrowed lines.

FIG. 7 shows the optical path of the optical power monitor system 009. The first optical signal from the first optical fiber array 014 passes through the first lens surface 022, which sufficiently collimates the light. The beam is then directed towards the partially reflective surface 021 on the glass plate 017. The transmitted optical signal 024 is directed toward the second lens 023, and is focused by the second lens 023 onto the second optical fiber 015. The reflected optical signal 025 is directed towards the PD array 019 disposed on the sub-substrate 012.

The photocurrent signal from the PD array 019 generated by the reflected optical signal 025 can be fed back to the interface integrated circuit 005 for feedback control of the optical power output of the VCSEL 004. The diameter of the optical beams 025 reaching the PD array 019 may be designed to match the size of the PD so that the entire optical beam from the VCSEL is monitored.

Figures 8A, 8B:
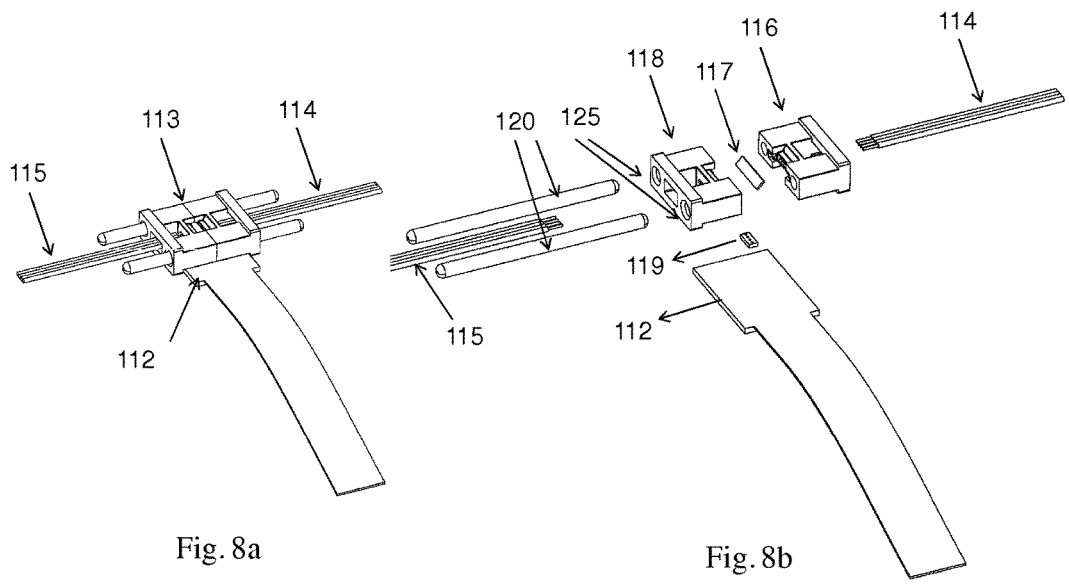
FIGS. 8a and 8b show perspective and exploded views of the optical transmitter module respectively that include an optical power monitor system having a flexible printed circuit board according to another embodiment of the present application.
Figure 9A:
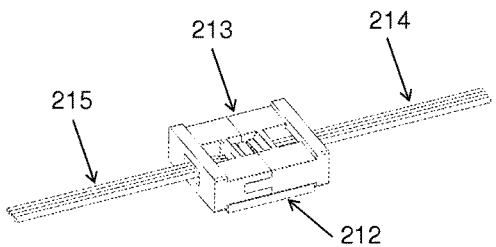

FIGS. 8*a* and 8*b* show respectively the perspective and exploded views of the optical transmitter module that includes an optical power monitor system that taps the power from the transmitting element inside the module according to a second embodiment. The structure of this second embodiment is similar to the structure of the first embodiment shown in FIGS. 3*a* and 3*b* in which like reference numerals represent like parts, and therefore will not be repeated here. The only difference is that the sub-substrate of the optical power monitor system of the second embodiment is a flexible printed circuit board 112 which can be connected with the main substrate by a plug or soldering.

In addition, prism wedges 026 can be introduced on each lens block 116, 118. When the two lens blocks 116, 118 are mated with each other, a cavity 028 is defined by the prism wedges 026 that could support the glass plate 117 (beam splitter) at an inclined angle of 45 degrees. These characteristics can simplify the assembly process.

FIGS. 9*a*, 9*b*, 10*a* and 10*b* show the optical power monitor system according to a third embodiment. The structure of this third embodiment is similar to the structure of the second embodiment shown in FIGS. 8*a* and 8*b* in which like reference numerals represent like parts, and therefore will not be repeated here. The only difference is that the alignment pins and holes are replaced by locating posts 225 and locating slots 226. In this embodiment, one rectangular locating post 225 may be integrally formed on one side of a first lens block 216 and may be adapted to mate with one corresponding rectangular locating slot 226 integrally formed on that side of a second lens block 218. In addition, one rectangular locating slot 226 may be integrally formed on the other side of the first lens block 216 and may be adapted to mate with one corresponding rectangular locating post 225 integrally formed on that other side of the second lens block 218.

FIGS. 11*a*, 11*b*, 12*a* and 12*b* show the optical power monitor system according to a fourth embodiment. The structure of this fourth embodiment is similar to the structure of the second embodiment shown in FIGS. 8*a* and 8*b* in which like reference numerals represent like parts, and therefore will not be repeated here. The only difference is that the optical power monitor system is mounted on a main substrate 312 which can be a printed circuit board. The sub-substrate of the optical power monitor system can be the main substrate 312 of the module, and the receiving optoelectronic component 319 and the beam splitting optical element 317 can be mounted directly on the main substrate 312.

While the optical transmitter module has been shown and described with particular references to a number of preferred embodiments thereof, it should be noted that various other changes or modifications may be made without departing from the scope of the appended claims.

What is claimed is:

1. An optical transmitter module comprising:
   (a) a housing;
   (b) a main substrate mounted inside the housing and provided with an interface integrated circuit, and an electrical interface electrically connected with the integrated circuit;
   (c) a transmitting optoelectronic component mounted on the main substrate;
   (d) a coupling optical element configured to couple a first optical signal from the transmitting optoelectronic component to a first light guiding structure; and
   (e) an optical power monitor system connected to the first light guiding structure and comprising a beam splitting optical element and a receiving optoelectronic component mounted on a sub-substrate;
   (f) wherein the beam splitting optical element is configured to split the first optical signal from the first light guiding structure into a transmitted optical signal and a reflected optical signal, and direct the transmitted optical signal towards an external optical interface via a second light guiding structure, and direct the reflected optical signal towards the receiving optoelectronic component configured to measure the power of the reflected optical signal, which is proportional to the first optical signal; and,
   wherein the beam splitting optical element comprises a first lens block, a second lens block and a beam splitter inserted between the first lens block and the second lens block.

2. The optical transmitter module as claimed in claim 1, wherein the first optical signal monitored by the optical power monitor system is fed back to an analog-to-digital converter circuit in a main circuitry for real time monitoring and control of optical power output of the transmitting optoelectronic component.

3. The optical transmitter module as claimed in claim 1, wherein the beam splitting optical element comprises a first lens block, a second lens block and a beam splitter inserted between the first lens block and the second lens block, and wherein the first lens block is configured to couple the first optical signal from the first light guiding structure to the beam splitter, the second lens block is configured to couple the transmitted optical signal from the beam splitter to the second light guiding structure, and the beam splitter is configured to reflect a minor portion of the first optical signal onto the receiving optoelectronic component and transmit a major portion of the first optical signal to the second lens block.

4. An optical transmitter module comprising:
   (a) a transmitting optoelectronic component mounted on a main substrate;
   (b) a coupling optical element configured to couple a first optical signal from the transmitting optoelectronic component to a first light guiding structure; and
   (c) an optical power monitor system connected to the first light guiding structure and comprising a beam splitting optical element and a receiving optoelectronic component mounted on a sub-substrate;
   (d) wherein the beam splitting optical element is configured to split the first optical signal from the first light guiding structure into a transmitted optic signal and a reflected optical signal, and direct the transmitted optical signal towards an external optical interface via a second light guiding structure, a direct the reflected optical signal towards the receiving optoelectronic component configured to measure the power of the reflected optical sign which is proportional to the first optical signal; and,
   wherein the beam splitting optical element comprises a first lens block, a second lens block and a beam splitter inserted between the first lens block and the second lens block.

5. The optical transmitter module as claimed in claim 4, wherein the first optical signal monitored by the optical power monitor system is fed back to an analog-to-digital converter circuit in a main circuitry for real time monitoring and control of optical power output of the transmitting optoelectronic component.

6. The optical transmitter module as claimed in claim 4, wherein the sub-substrate of the optical power monitor system is a printed circuit board.

7. The optical transmitter module as claimed in claim 4, wherein the sub-substrate of the optical power monitor system is a flexible circuit board.

8. The optical transmitter module as claimed in claim 4, wherein the sub-substrate of the optical power monitor system is the main substrate of the module, and the receiving optoelectronic component and the beam splitting optical element are mounted directly on the main substrate.

9. The optical transmitter module as claimed in claim 4, wherein the beam splitting optical element is bonded onto the sub-substrate and defines a cavity that accommodates the receiving optoelectronic component.

10. The optical transmitter module as claimed in claim 4, wherein the first lens block is configured to couple the first optical signal from the first light guiding structure the beam splitter, the second lens block is configured to couple the transmitted optic signal from the beam splitter to the second light guiding structure, and the beam splitter is configured to reflect a minor portion of the first optical signal onto the receiving optoelectronic component and transmit a major portion of the first optic signal to the second lens block.

11. The optical transmitter module as claimed in claim 4, wherein the first lens block is identical to the second lens block.

12. The optical transmitter module as claimed in claim 4, wherein the beam splitter is a glass plate with a partially reflective surface, and the glass plate is placed bet the first and second lens blocks, and the normal of the glass plate is at an inclined angle of 45 degrees with respect to an optical path between the first and second blocks.

13. The optical transmitter module as claimed in claim 12, wherein each of the first and second lens blocks further comprises a prism wedge structure, and when the first and second lens blocks are mated to each other, the prism wedge structures define a cavity that accommodates the glass plate at the inclined angle.

14. The optical transmitter module as claimed in claim 4, wherein each of the and second lens blocks further comprises an alignment pin hole, and the 1 splitting optical component further comprises alignment metal pins that are ins into the pin holes respectively to physically and optically align the first and se lens blocks.

15. The optical transmitter module as claimed in claim 4, wherein each of the and second lens blocks further comprises a locating post and a locating slot, an first and second lens blocks align with each other physically and optically by m the locating posts and the locating slots.

16. The optical transmitter module as claimed in claim 15, wherein the locating posts and the locating slots are rectangular in shape.

17. The optical transmitter module as claimed in claim 4, wherein the main substrate is provided with an interface integrated circuit, and an electrical interface is electrically connected with the interface integrated circuit.

18. The optical transmitter module as claimed in claim 4, wherein the main substrate is mounted inside a housing.

19. The optical transmitter module as claimed in claim 18, wherein the housing comprises an upper housing and a lower housing.

* * * * *